United States Patent
Namba et al.

(10) Patent No.: US 11,626,598 B2
(45) Date of Patent: Apr. 11, 2023

(54) METHOD OF PRODUCING FUEL CELL STACK

(71) Applicant: HONDA MOTOR CO., LTD., Tokyo (JP)

(72) Inventors: Kensuke Namba, Wako (JP); Naoki Kushitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/367,985

(22) Filed: Jul. 6, 2021

(65) Prior Publication Data

US 2022/0013795 A1 Jan. 13, 2022

(30) Foreign Application Priority Data

Jul. 7, 2020 (JP) .............................. JP2020-117190

(51) Int. Cl.
*H01M 8/0286* (2016.01)
*H01M 8/1004* (2016.01)
*H01M 8/2404* (2016.01)

(52) U.S. Cl.
CPC ....... *H01M 8/0286* (2013.01); *H01M 8/1004* (2013.01); *H01M 8/2404* (2016.02)

(58) Field of Classification Search
CPC . H01M 8/0286; H01M 8/2404; H01M 8/1004
See application file for complete search history.

(56) References Cited

U.S. PATENT DOCUMENTS

| 2009/0087717 | A1* | 4/2009 | Akimoto | ............. H01M 8/2404 100/9 |
| 2018/0226665 | A1 | 8/2018 | Oyama et al. | |
| 2020/0251765 | A1* | 8/2020 | Ikeda | .................... H01M 8/247 |

FOREIGN PATENT DOCUMENTS

JP 2018-125258 A 8/2018

* cited by examiner

*Primary Examiner* — Karie O'Neill Apicella
(74) *Attorney, Agent, or Firm* — Carrier Shende & Associates, P.C.; Joseph P. Carrier; Jeffrey T. Gedeon

(57) ABSTRACT

A fuel cell stack includes a first metal separator and a second metal separator sandwiching a membrane electrode assembly. Bead seals are provided on the first and second metal separators. The bead seals protrude toward the membrane electrode assembly. A seal member is provided on a top part of each of the bead seals. In the process of producing the fuel cell stack, pressure medium is supplied to a coolant flow field formed between the first metal separator and the second metal separator. The supply pressure of the pressure medium is set to not less than the supply pressure of a coolant supplied to the coolant flow field during normal operation of the fuel cell stack.

9 Claims, 6 Drawing Sheets

METHOD OF PRODUCING FUEL CELL STACK

CROSS-REFERENCE TO RELATED APPLICATION

This application is based upon and claims the benefit of priority from Japanese Patent Application No. 2020-117190 filed on Jul. 7, 2020, the contents of which are incorporated herein by reference.

BACKGROUND OF THE INVENTION

Field of the Invention

The present invention relates to a method of producing a fuel cell stack formed by stacking a plurality of power generation cells together.

Description of the Related Art

An anode is disposed on one surface of an electrolyte membrane, and a cathode is disposed on the other surface of the electrolyte membrane to form a membrane electrode assembly (MEA). A power generation cell of a fuel cell stack is formed by sandwiching the MEA between a pair of separators. The fuel cell stack is formed by stacking a predetermined number of the power generation cells together. For example, the fuel cell stack is incorporated into a fuel cell vehicle (fuel cell electric automobile, etc.).

For example, the separator is made of metal material. In this case, a bead seal may be formed by press forming for obtaining a separator. That is, the bead seal is a part of the separator. When the power generation cells are stacked together, the bead seal has a shape where the bead seal protrudes toward the MEA. As described in JP 2018-125258 A, a seal member may be provided on a top part of the bead seal. By bringing the top part of the bead seal or the seal member into contact with the MEA, it is possible to prevent leakage of the reactant gases and the coolant through a position between the separator and the MEA.

SUMMARY OF THE INVENTION

A main object of the present invention is to provide a method of producing a fuel cell stack in which it is possible to seal a position between a metal separator and a membrane electrode assembly more suitably.

According to one embodiment of the present invention, a method of producing a fuel cell stack is provided. The fuel cell stack is formed by stacking a plurality of power generation cells together. Each of the power generation cells includes a first metal separator provided on one surface of a membrane electrode assembly, a second metal separator provided on the other surface of the membrane electrode assembly, a bead seal provided on a surface of each of the first metal separator and the second metal separator facing the membrane electrode assembly, and protruding toward the membrane electrode assembly, and a seal member interposed between a top part of the bead seal and the membrane electrode assembly. The method includes a stacking step of stacking the plurality of power generation cells together to obtain the fuel cell stack, a pressure medium supplying step of supplying pressure medium to a coolant flow field formed between the first metal separator and the second metal separator. In the pressure medium supplying step, the pressure medium is supplied at the supply pressure of not less than the supply pressure of a coolant supplied to the coolant flow field during normal operation of the fuel cell stack.

It should be noted that the membrane electrode assembly may comprise only a power generation unit formed by sandwiching the electrolyte membrane between the anode and the cathode. Alternatively, the membrane electrode assembly may be a so called resin frame equipped membrane electrode assembly including the power generation unit and a resin frame surrounding outer circumference of the power generation unit. The membrane electrode assembly in the present invention includes both of concepts.

Further, the pressure medium may be configured to flow through the coolant flow field all the time. Alternatively, the pressure medium guided into the coolant flow field at a predetermined pressure may be retained in the coolant flow field. The scope of the "supply" in the present invention includes both of the cases.

In the present invention, the pressure medium is supplied to the coolant flow field of the fuel cell stack at the supply pressure of not less than the supply pressure of the coolant supplied to the coolant flow field during normal operation of the fuel cell stack. As a result, the seal member provided for the bead seal of the metal separator is pressed against the membrane electrode assembly. In this manner, since the seal member tightly contacts the membrane electrode assembly, the position (i.e. interface) between the metal separator and the membrane electrode assembly is sealed sufficiently. That is, the position between the metal separator and the membrane electrode assembly can be sealed more suitably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a method of a fuel cell stack according to the present invention will be described in detail with reference to the accompanying drawings.

Figure 1:
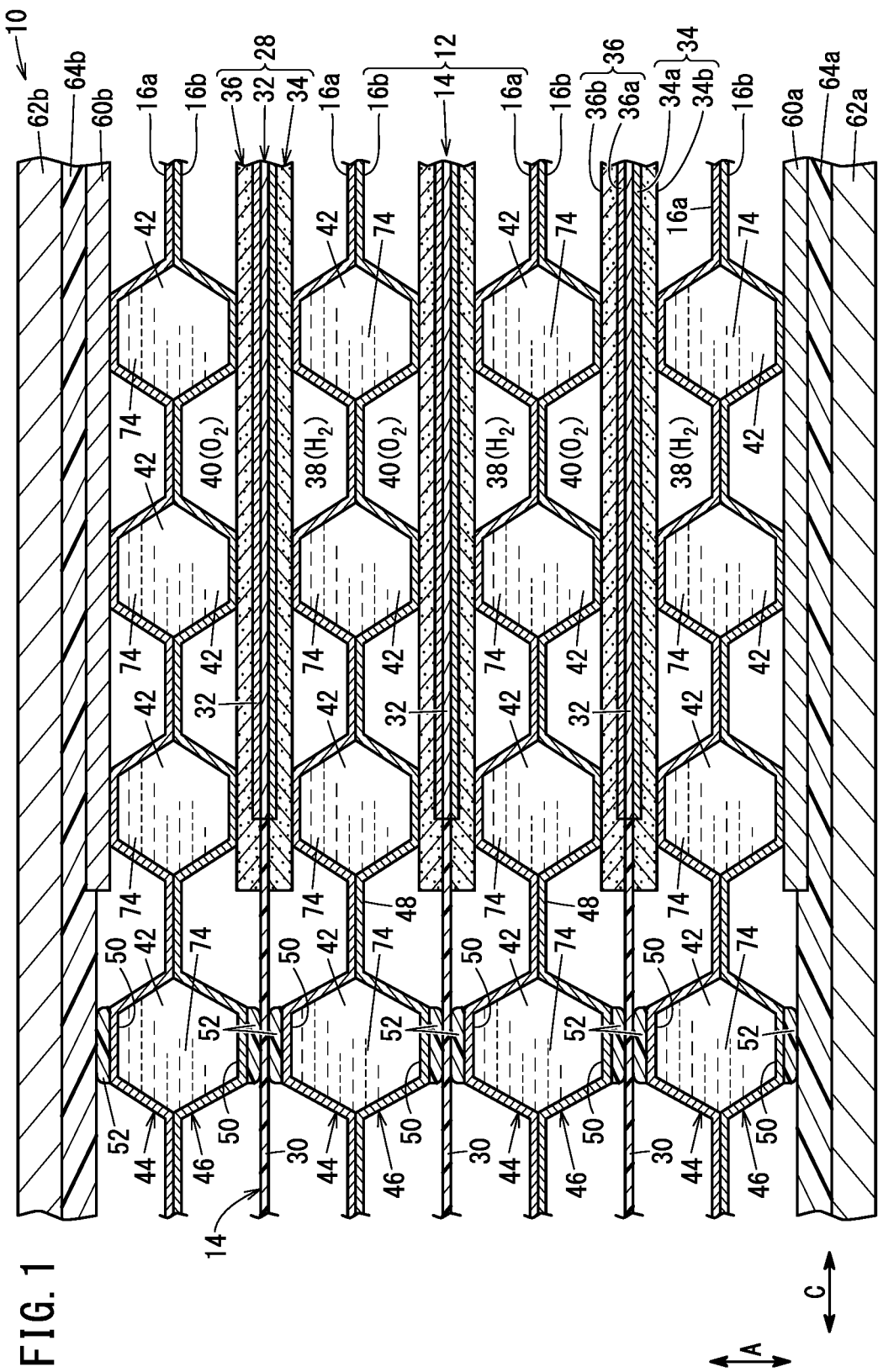
FIG. 1 is a cross sectional view with partial omission showing a fuel cell stack in a stacking direction of the fuel cell stack.

Firstly, structure of the fuel cell stack 10 will be described with reference to FIGS. 1 to 3. FIG. 1 is a cross sectional view with partial omission showing the fuel cell stack 10 in a stacking direction of the fuel cell stack 10. The fuel cell stack 10 comprises a stack of a plurality of power generation cells 12. That is, the fuel cell stack 10 is formed by stacking a predetermined number of the power generation cells 12 in a direction indicated by an arrow A (horizontal direction), and thereafter, applying a predetermined tightening load in the stacking direction to the power generation cells 12. For ease of understanding, it should be noted that, although FIG. 1 is simplified to show three power generation cells 12, the number of the power generation cells 12 is not limited to three.

Figure 2:
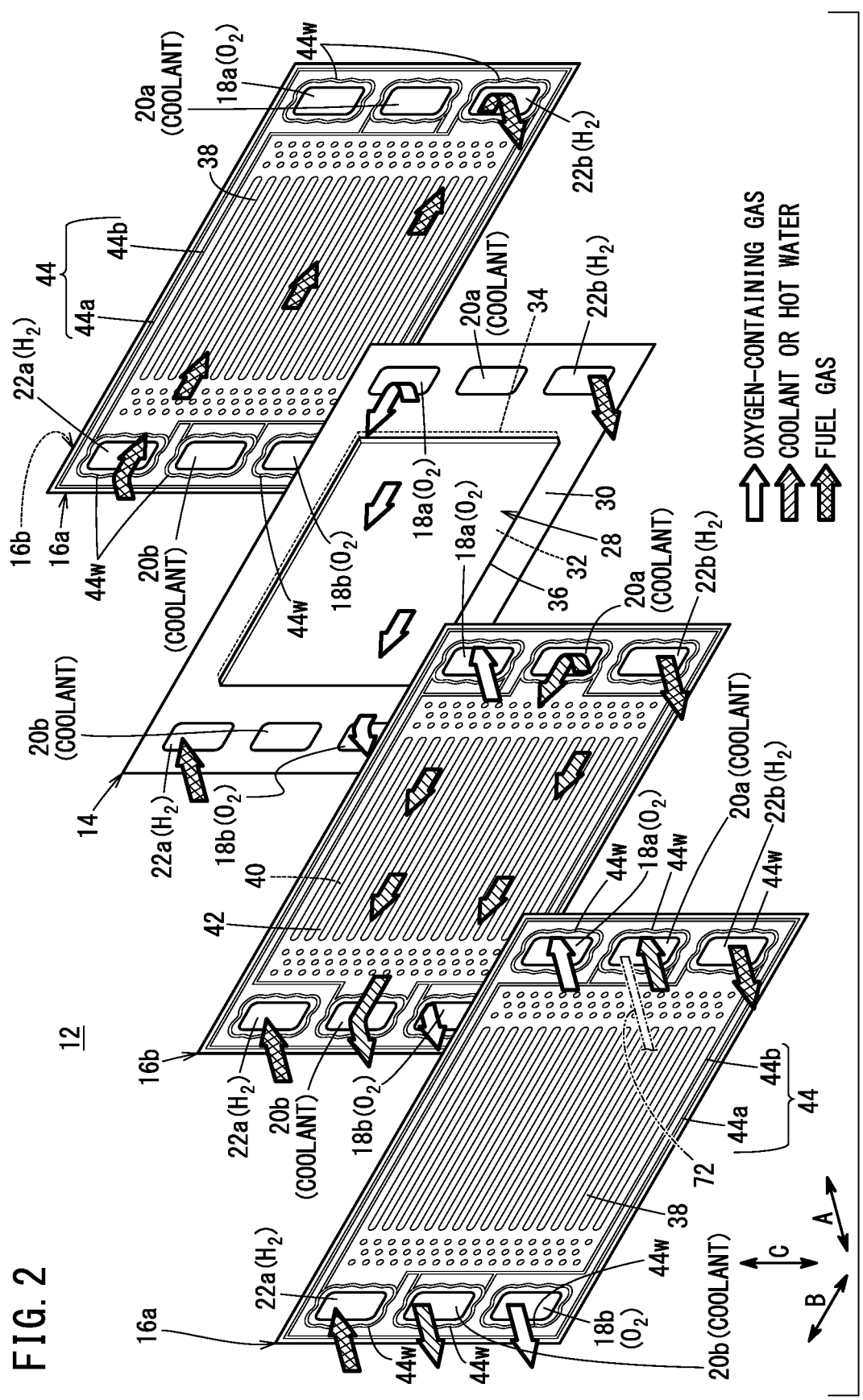
FIG. 2 is an exploded perspective view schematically showing a power generation cell of the fuel cell stack.

FIG. 2 is an exploded perspective view schematically showing the power generation cell 12. The power generation cell 12 includes a resin frame equipped membrane electrode assembly (hereinafter also referred to as the "resin frame equipped MEA") 14, a first metal separator 16a provided on one surface of the resin frame equipped MEA 14, and a second metal separator 16b provided on the other surface of the resin frame equipped MEA 14.

At one end of the power generation cell 12 in the direction indicated by an arrow B (horizontal direction), an oxygen-containing gas supply passage 18a, a coolant supply passage 20a, and a fuel gas discharge passage 22b are provided. The oxygen-containing gas supply passage 18a, the coolant supply passage 20a, and the fuel gas discharge passage 22b extend through the power generation cell 12 in the direction by the arrow A. An oxygen-containing gas is supplied to the oxygen-containing gas supply passage 18a. Further, a coolant such as water, ethylene glycol, or oil is supplied to the coolant supply passage 20a. The fuel gas discharge passage 22b is a passage for discharging a fuel gas such as a hydrogen-containing gas. The oxygen-containing gas supply passage 18a, the coolant supply passage 20a, and the fuel gas discharge passage 22b are arranged in the direction indicated by an arrow C (vertical direction).

At the other end of the power generation cell 12 in the direction indicated by the arrow B, a fuel gas supply passage 22a, a coolant discharge passage 20b, and an oxygen-containing gas discharge passage 18b are provided. The fuel gas supply passage 22a, the coolant discharge passage 20b, and the oxygen-containing gas discharge passage 18b extend through the power generation cell 12 in the direction indicated by the arrow A. The fuel gas supply passage 22a, the coolant discharge passage 20b, and the oxygen-containing gas discharge passage 18b are arranged in the direction indicated by the arrow C.

The resin frame equipped MEA 14 includes a power generation unit 28, and a resin frame member 30 joined to, and provided around an outer peripheral portion of the power generation unit 28. The power generation unit 28 of the resin frame equipped MEA 14 includes an electrolyte membrane 32, an anode 34 provided on one surface of the electrolyte membrane 32, and a cathode 36 provided on the other surface of the electrolyte membrane 32.

For example, the electrolyte membrane 32 is a solid polymer electrolyte membrane (cation ion exchange membrane). For example, the sold polymer electrolyte membrane is a thin membrane of perfluorosulfonic acid containing water. Suitable examples of the electrolyte membrane 32 includes such fluorine based electrolyte. Additionally, an HC (hydrocarbon) based electrolyte may be used as the electrolyte membrane 32. The electrolyte membrane 32 is held between the anode 34 and the cathode 36.

As shown in FIG. 1, the anode 34 includes a first electrode catalyst layer 34a joined to one surface of the electrolyte membrane 32, and a first gas diffusion layer 34b stacked on the first electrode catalyst layer 34a. Likewise, the cathode 36 includes a second electrode catalyst layer 36a joined to the other surface of the electrolyte membrane 32, and a second gas diffusion layer 36b stacked on the second electrode catalyst layer 36a.

The resin frame member 30 is a frame shaped resin film (sub-gasket) having a rectangular shape in a plan view, and an inner peripheral portion of the resin frame member 30 is joined to the outer peripheral portion of the power generation unit 28. The resin frame member 30 has a substantially constant thickness. In FIG. 2, at one end of the resin frame member 30 in the direction indicated by the arrow B, the oxygen-containing gas supply passage 18a, the coolant supply passage 20a, and the fuel gas discharge passage 22b are provided. At the other end of the resin frame member 30 in the direction indicated by the arrow B, the fuel gas supply passage 22a, the coolant discharge passage 20b, and the oxygen-containing gas discharge passage 18b are provided. Fluid passages 18a, 18b, 20a, 20b, 22a, 22b provided in the resin frame member 30 have the same shapes as the fluid passages 18a, 18b, 20a, 20b, 22a, 22b provided in the first metal separator 16a and the second metal separator 16b.

Examples of suitable materials of the resin frame member 30 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

In the power generation cell 12, the resin frame equipped MEA 14 is sandwiched between the first metal separator 16a and the second metal separator 16b. For example, each of the first metal separator 16a and the second metal separator 16b is obtained by press forming of predetermined metal material to have a corrugated shape in cross section. Examples of suitable metal materials include a steel plate, a stainless steel plate, and an aluminum plate, a plated steel plate. Alternatively, a metal thin plate having an anti-corrosive surface formed by surface treatment may be used. Outer peripheral portions of the first metal separator 16a and the second metal separator 16b are joined together by welding, brazing, crimping, etc. integrally.

The first metal separator 16a has a fuel gas flow field 38 on its surface facing the resin frame equipped MEA 14. The fuel gas flow field 38 is connected to the fuel gas supply passage 22a and the fuel gas discharge passage 22b. That is, the fuel gas flow field 38 is formed between the first metal separator 16a and the resin frame equipped MEA 14. The fuel gas flow field 38 includes a plurality of straight flow grooves (or wavy flow grooves) extending in the direction indicated by the arrow B.

Figure 3:
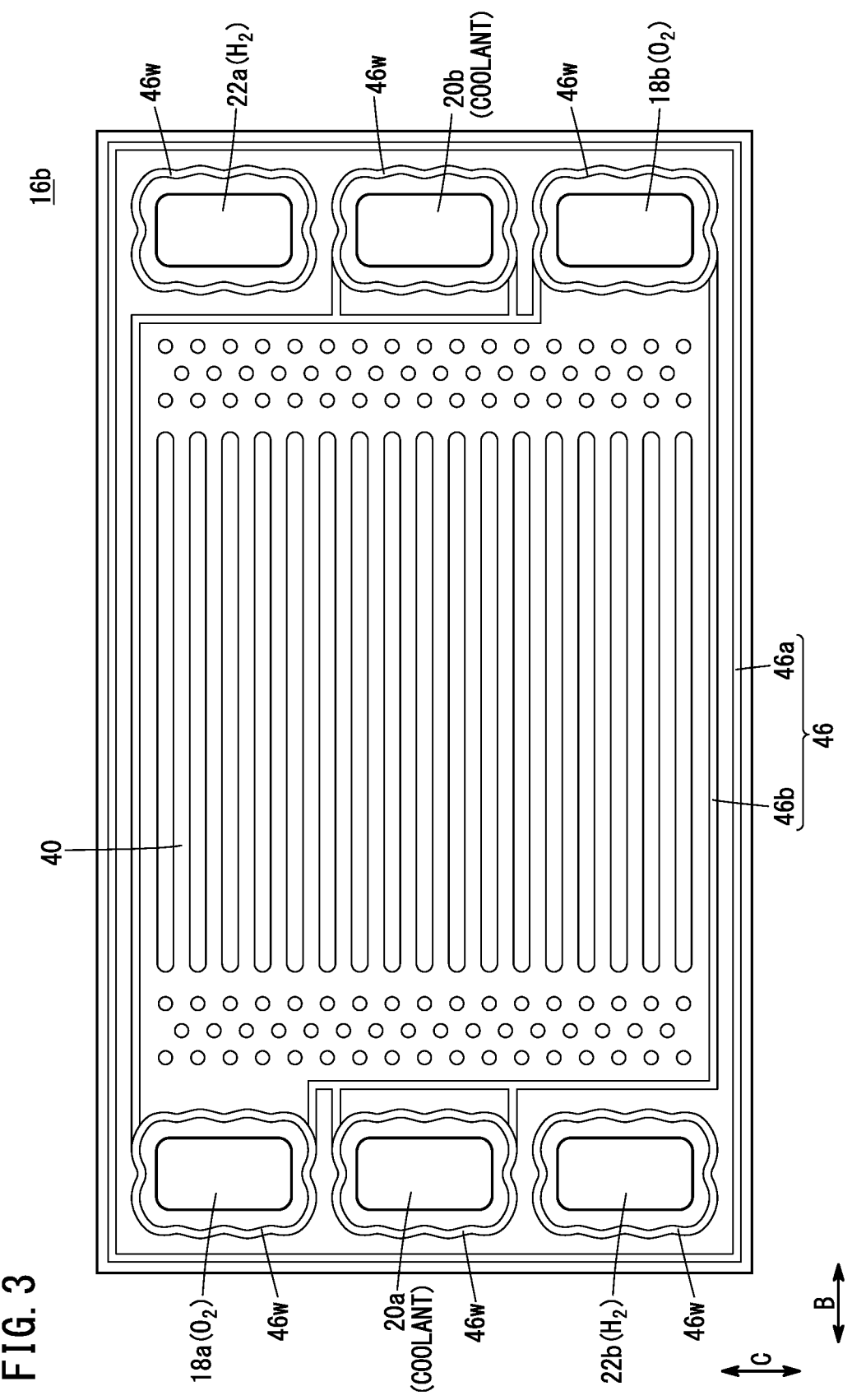
FIG. 3 is a front view schematically showing a second metal separator.

As shown in FIG. 3, the second metal separator 16b has an oxygen-containing gas flow field 40 on its surface facing the resin frame equipped MEA 14. The oxygen-containing gas flow field 40 is connected to the oxygen-containing gas supply passage 18a and the oxygen-containing gas discharge passage 18b. The oxygen-containing gas flow field 40 is formed between the second metal separator 16b and the resin frame equipped MEA 14. The oxygen-containing gas flow field 40 includes a plurality of straight flow grooves (or wavy flow grooves) extending in the direction indicated by the arrow B.

In FIG. 2, a coolant flow field 42 extending in the direction indicated by the arrow B is formed between the first metal separator 16a and the second metal separator 16b that are adjacent to each other. The coolant flow field 42 is connected to the coolant supply passage 20a and the coolant discharge passage 20b. The coolant comprises coolant medium.

The first metal separator 16a is provided with a bead seal 44 on its surface facing the power generation unit 28. The bead seal 44 is formed integrally with the first metal separator 16a by press forming. The bead seal 44 prevents leakage of fluid (the fuel gas, the oxygen-containing gas, or the coolant). The bead seal 44 is expanded (protrudes) toward the resin frame member 30 of the resin frame equipped MEA 14, and tightly contacts the resin frame member 30 in an air tight and liquid tight manner.

The bead seal 44 includes an outer line shape part 44a formed around the outer peripheral portion of the first metal separator 16a, and an inner line shape part 44b provided inside the outer line shape part 44a. Further, wave shape parts 44w are formed around the fluid passages 18a, 18b, 20a, 20b, 22a, 22b, respectively. The wave shape parts 44w, except those formed around the oxygen-containing gas supply passage 18a and the oxygen-containing gas discharge passage 18b, are continuous with the inner line shape part 44b. The wave shape parts 44w are included in the bead seal 44 as well.

On the other hand, as shown in FIG. 3, the second metal separator 16b is provided with a bead seal 46 on its surface facing the power generation unit 28. The bead seal 46 is formed integrally with the second metal separator 16b by press forming. The bead seal 46 is expanded toward the resin frame member 30, and contacts the resin frame member 30 in an air tight and liquid tight manner. The bead seal 44 and the bead seal 46 face each other through the resin frame member 30. Stated otherwise, the resin frame member 30 is sandwiched between the bead seals 44, 46.

The bead seal 46 includes an outer line shape part 46a formed around the outer peripheral portion of the second metal separator 16b, and an inner line shape part 46b provided inside the outer line shape part 46a. Further, wave shape parts 46w are formed around the fluid passages 18a, 18b, 20a, 20b, 22a, 22b, respectively. The wave shape parts 46w, except those formed around the fuel gas supply passage 22a and the fuel gas discharge passage 22b, are continuous with the inner line shape part 46b.

Referring back to FIG. 1, the bead seals 44, 46 protrude from a flat and thin base part 48 in the first metal separator 16a and the second metal separator 16b, and are oriented in the stacking direction of the power generation cells 12, and has a so called tapered shape where the width is reduced in a direction away from the base part 48 (direction toward the resin frame member 30). A flat top part 50 is formed at a position of each of the bead seals 44, 46, remotest from the base part 48. The bead seals 44, 46 may not necessarily have the same thickness and/or shape, etc.

Seal members 52 are fixed to the top parts 50 of the bead seals 44, 46 by printing or coating, etc. Therefore, the top part 50 of the bead seal 44 contacts the resin frame member 30 through the seal member 52. For example, polyester resin, silicone resin, etc. are used suitably as the seal member 52. In FIG. 1, for ease of understanding, the seal member 52 is shown in the state before the seal member 52 is compressed. It should be noted that the seal member 52 may be provided on the part of the resin frame member 30.

The fuel cell stack 10 includes a first terminal plate 60a electrically connected to the anode 34 of the power generation cell 12, a second terminal plate 60b electrically connected to the cathode 36 of the power generation cell 12, and a first end plate 62a and a second end plate 62b provided outside the first terminal plate 60a and the second terminal plate 60b in the stacking direction, respectively. The first end plate 62a and the second end plate 62b are tightened together using tightening members such as tie rods (not shown) to apply a predetermined tightening load to a stack of the power generation cells 12. It should be noted that a predetermined external electrical load such as a motor is electrically connected to the first terminal plate 60a and the second terminal plate 60b.

A first insulating plate 64a is inserted between the first terminal plate 60a and the first end plate 62a, and, and a second insulating plate 64b is inserted between the second terminal plate 60b and the second end plate 62b. Therefore, electrical conduction from the first terminal plate 60a to the first end plate 62a, or electrical conduction from the second terminal plate 60b to the second end plate 62b does not occur.

In this regard, the outer dimensions of the first insulating plate 64a and the second insulating plate 64b are large in comparison with the first terminal plate 60a and the second terminal plate 60b. Therefore, some parts of the bead seals 44, 46 of the first metal separator 16a and the second metal separator 16b positioned at the end in the stacking direction are positioned outside the outer marginal portions of the first terminal plate 60a and the second terminal plate 60b, and face the first insulating plate 64a and the second insulating plate 64b.

The seal member 52 provided on the top part 50 of the bead seal 46 of the second metal separator 16b which is the closest to, and faces the first insulating plate 64a is in contact with the first insulating plate 64a. Likewise, the seal member 52 provided on the top part 50 of the bead seal 44 of the first metal separator 16a which is the closest to, and faces the second insulating plate 64b is in contact with the second insulating plate 64b.

FIG. 2 shows a thermocouple 72. The thermocouple 72 and a computation unit 70 (see FIG. 4) jointly constitute a temperature measuring instrument. In the illustrated example, although the thermocouple 72 is inserted into the coolant supply passage 20a for measuring the temperature of pressure medium (pressurized hot water 74 in the embodiment of the present invention) flowing through the coolant supply passage 20a, the thermocouple 72 may be inserted into any of the other fluid passages 18a, 18b, 20b, 22a, 22b.

Figure 4:
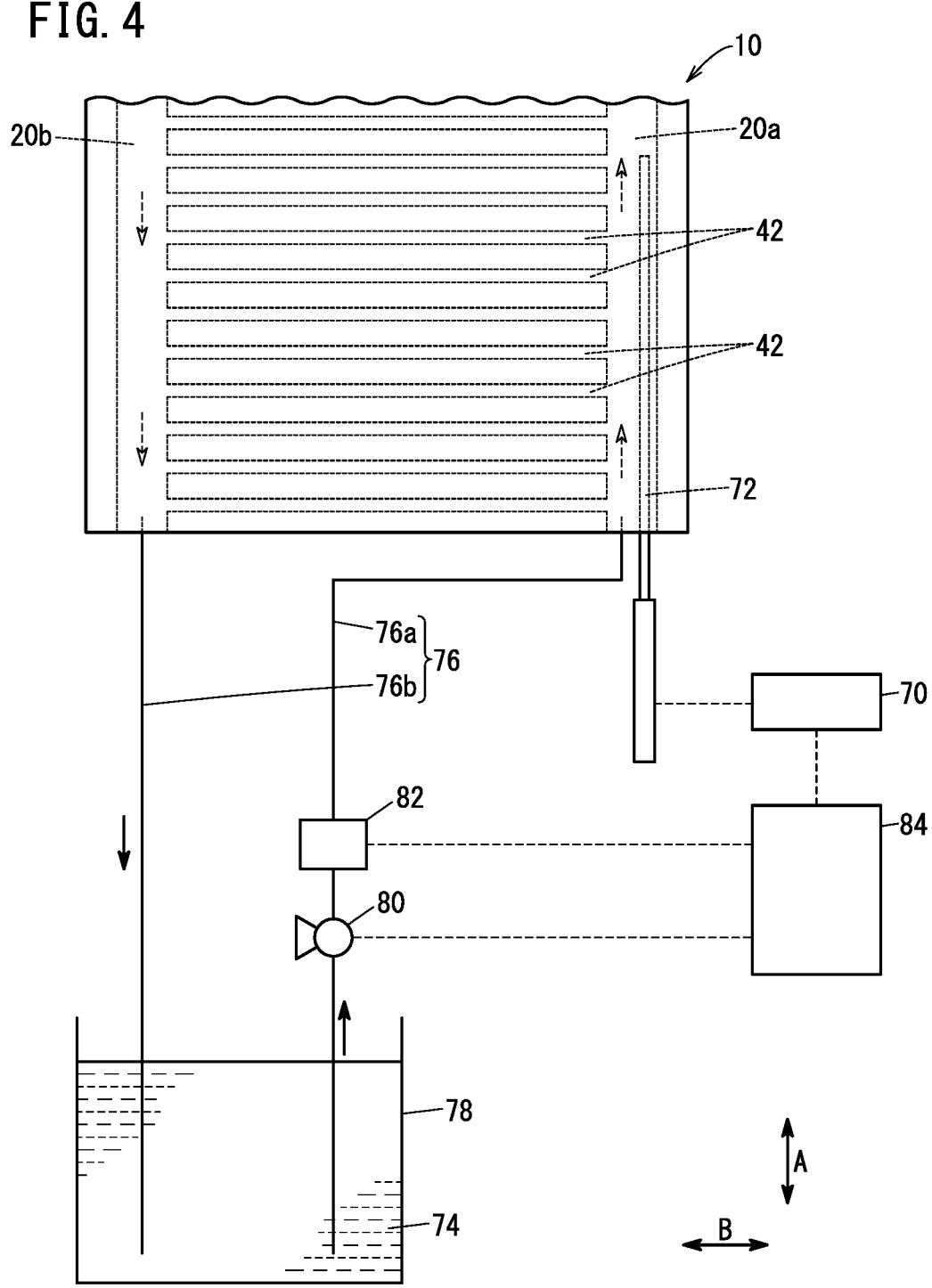
FIG. 4 is a plan view schematically showing apparatus structure for performing a pressure medium supply step.

In a pressure medium supplying step S2 described later, as shown in FIG. 4, a forward channel 76a and a return channel 76b of a circulation supply pipe 76 are connected to the coolant supply passage 20a and the coolant discharge passage 20b, respectively. The forward channel 76a is provided with a pump 80 for supplying hot water 74 from a tank 78, and a temperature regulator 82. The temperature regulator 82 and the computation unit 70 are electrically connected to a control unit 84, and the control unit 84 controls the temperature regulator 82 based on the temperature measured by the temperature measuring instrument. As a result, the temperature of the hot water 74 is regulated.

Further, the control unit 84 is electrically connected to the pump 80 as well, and controls the discharge pressure of the pump 80. It is a matter of course that the hot water 74 supplied into the fuel cell stack 10 from the forward channel 76a through the coolant supply passage 20a flows through the coolant flow field 42 and flows into the coolant discharge passage 20b, and then, flows into the return channel 76b of the circulation supply pipe 76.

The forward channel 76a or the return channel 76b is provided with a valve (not shown). When the valve is opened, the hot water 74 can flow through the circulation supply pipe 76, and when the valve is closed, flow of the hot water 74 is suspended.

Next, a method of producing the fuel cell stack 10, for obtaining the fuel cell stack 10 basically having the structure as described above will be described.

Figure 5:
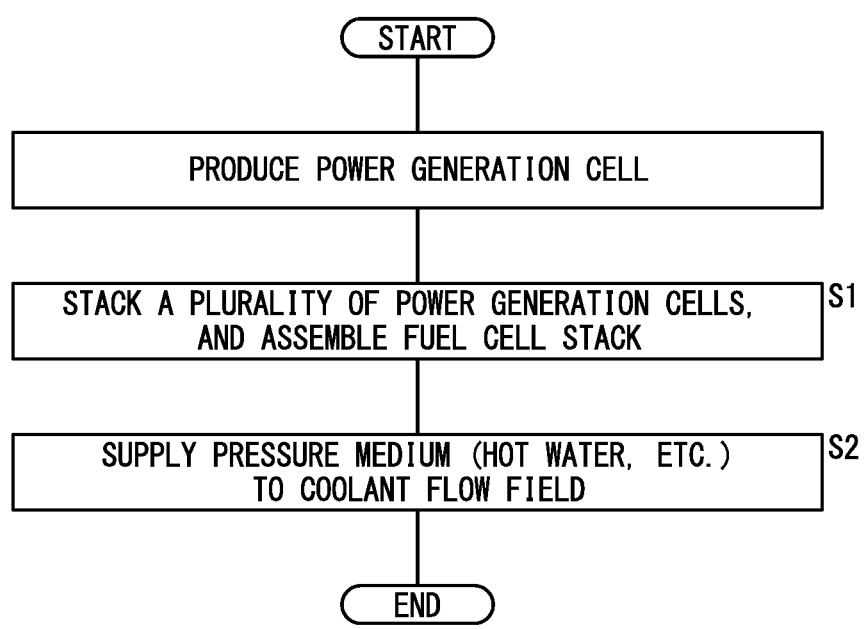
FIG. 5 is a schematic flow chart showing a method of producing the fuel cell stack according to an embodiment of the present invention.

FIG. 5 is a flow chart schematically showing the production method according to the embodiment of the present invention. This production method includes a stacking step S1 of stacking the power generation cells 12 together, and the pressure medium supplying step S2 of supplying the pressure medium to the coolant flow field 42.

Prior to the stacking step S1, the power generation cell 12 is produced. That is, the power generation unit 28 is fitted to an inner opening of the resin frame member 30 to obtain the resin frame equipped MEA 14. Thereafter, the resin frame equipped MEA 14 is sandwiched between the first metal separator 16a and the second metal separator 16b. It is a matter of course that, at this time, the fluid passages 18a, 18b, 20a, 20b, 22a, 22b are overlapped together, and the seal member 52 is interposed between the resin frame member 30 and the top part 50 of the bead seal 44. As a result, the power generation cell 12 is obtained.

In the stacking step S1, a predetermined number of the power generation cells 12 are stacked together. At one end in the stacking direction, the second metal separator 16b is exposed, and at the other end in the stacking direction, the first metal separator 16a is exposed. The first terminal plate 60a is provided at the end where the second metal separator 16b is exposed, and the second terminal plate 60b is provided at the end where the first metal separator 16a is exposed. At this time point, a part of the first metal separator 16a and a part of the second metal separator 16b are positioned outside the outer marginal portions of the first terminal plate 60a and the second terminal plate 60b.

Further, the first insulating plate 64a and the second insulating plate 64b are provided outside the first terminal plate 60a and the second terminal plate 60b as viewed in the stacking direction, respectively. At this time, the seal member 52 is interposed between the first insulating plate 64a and the top part 50 of the bead seal 46 of the second metal separator 16b which is the closest to the first insulating plate 64a. Likewise, the seal member 52 is interposed between the second insulating plate 64b and the top part 50 of the bead seal 44 of the first metal separator 16a which is the closest to the second insulating plate 64b.

Thereafter, the first end plate 62a and the second end plate 62b are provided outside the first insulating plate 64a and the second insulating plate 64b in the stacking direction, respectively. In this manner, the fuel cell stack 10 is obtained. Further, tightening members (not shown) such as tie-rods are provided between the first end plate 62a and the second end plate 62b, and the tightening members are adjusted to apply a predetermined tightening load to the fuel cell stack 10.

Next, the pressure medium supplying step S2 is performed. As described above, in the embodiment of the present invention, as the pressure medium, the hot water 74 is supplied to the fuel cell stack 10 through the circulation supply pipe 76. It should be noted that, before supplying the hot water 74 by circulation supply pipe 76, a preset temperature of the hot water 74 and the discharge pressure of the pump 80 are inputted to the control unit 84. The control unit 84 controls the temperature regulator 82 in a manner that the temperature of the hot water 74 is maintained at the preset temperature.

When the pump 80 is actuated and the valve provided for the circulation supply pipe 76 is opened, pure water stored in the tank 78 beforehand is started to be sent to the fuel cell stack 10. At this time, the pump 80 discharges the pure water at the preset discharge pressure set in the control unit 84. The discharge pressure becomes the supply pressure of the pure water. The supply pressure is set to not less than the supply pressure of the coolant (water, ethylene glycol, oil, etc.) supplied to the coolant flow field 42 during normal operation of the fuel cell stack 10. The reason for setting the supply pressure in the above manner will be described later.

The pure water flows into the temperature regulator 82 provided for the forward channel 76a of the circulating supply pipe 76. As described above, the temperature regulator 82 regulates the temperature of the pure water to the preset temperature inputted to the control unit 84. Normally, the pure water at room temperature is heated to obtain the hot water 74 having the temperature of about 70° C. to 80° C. Therefore, the hot water 74 flows through the coolant supply passage 20a, the coolant flow field 42, and the coolant discharge passage 20b through the circulation supply pipe 76. By this circulation flow, the heat is transmitted from the hot water 74 to the fuel cell stack 10. As a result, the temperature of the fuel cell stack 10 is increased, and the seal member 52 (see FIG. 1) is heated. It is a matter of course that the hot water 74 flows through the return channel 76b of the circulation supply pipe 76, and returns to the tank 78.

By this heating, the seal member 52 is softened. That is, the seal member 52 becomes compressible easily. In this manner, by heating the seal member 52, it becomes possible to easily deform the seal member 52.

The temperature of the hot water 74 is detected by the thermocouple 72, and converted into a measurement value by the computation unit 70. The measurement value is sent to the control unit 84. In the case where the temperature of the hot water 74 exceeds the preset temperature, the control unit 84 performs control to reduce the degree of increase in the temperature by the temperature regulator 82. Therefore, it is possible to prevent overheating of the seal member 52, and avoid thermal denaturation (embrittlement, etc.) of the seal member 52 due to overheating.

Figure 6:
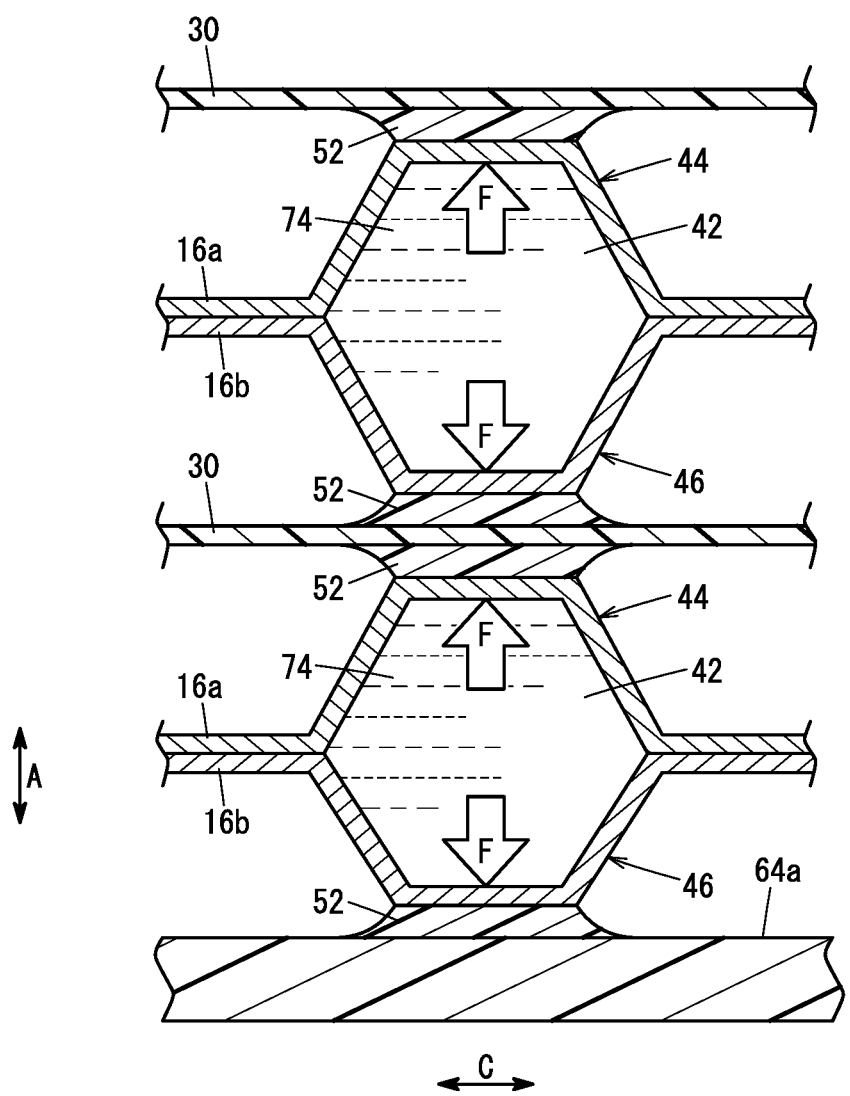
FIG. 6 is an enlarged schematic view showing main part, where a seal member is pressed by pressure medium supplied to a coolant flow field.

In this regard, as described above, the hot water 74 flows through the coolant flow field 42. Further, the hot water 74 is supplied at the supply pressure which is not less than the supply pressure of the coolant during the normal operation of the fuel cell stack 10. Therefore, as shown in FIG. 6, a pressing force F is applied to each of the bead seals 44, 46 of the first metal separator 16a and the second metal separator 16b in a manner that the coolant flow field 42 is expanded (the bead seals 44, 46 are expanded) in the stacking direction of the power generation cells 12.

Therefore, the seal member 52 is pressed against the resin frame member 30 of the resin frame equipped MEA 14. As described above, since the seal member 52 is softened by heating, the seal member 52 is easily deformed (collapsed), and spread in the surface direction of the resin frame member 30. Stated otherwise, the contact area between the seal member 52 and the resin frame member 30 is increased.

As described above, the seal member 52 is heated to enough to be softened, and the hot water 74 is supplied to the coolant flow field 42 at the supply pressure of not less than the supply pressure of the coolant flowing through the coolant flow field 42 during normal operation. In this manner, it is possible to bring the seal member 52 into contact with the resin frame member 30, i.e., the resin frame equipped MEA 14 tightly. It should be noted that, in the case where the supply pressure of the hot water 74 is excessively low, it becomes difficult to expand the bead seals 44, 46 sufficiently. Further, in the case where the supply pressure of the hot water 74 is excessively large, there is a concern that plastic deformation of the bead seals 44, 46 or each of the related members may occur. In order to prevent the above problems, preferably, the supply pressure of the hot water 74 is set within the range of about 1.1 to 3 times larger than the supply pressure of the coolant during the normal operation of the fuel cell stack 10.

After the hot water 74 flows for a predetermined period of time, the pump 80 is stopped under control operation of the control unit 84, and the valve is closed. As a result, supply of the hot water 74 to the fuel cell stack 10 is stopped. Therefore, heating of the fuel cell stack 10 is stopped as well. Thereafter, by forcibly cooling the fuel cell stack 10 by sending cooling air to the fuel cell stack 10, or naturally cooling the fuel cell stack 10, the temperature of the fuel cell stack 10 is lowered.

When the temperature of the fuel cell stack 10 is lowered, the seal member 52 is hardened. In this regard, the seal member 52 has a shape where the seal member 52 is expanded in the surface direction of the resin frame member 30, and the contract area with the resin frame member 30 is sufficiently large. Stated otherwise, the seal member 52 sufficiently and tightly contacts the resin frame member 30. Since the seal member 52 is hardened in this state, the positions between the bead seals 44, 46 and the resin frame member 30 (or the resin frame equipped MEA 14) are sealed suitably.

The above point is applicable to the second metal separator 16b which is the closest to the first insulating plate 64a, and the first metal separator 16a which is the closest to the second insulating plate 64b. That is, the seal member 52 provided on the bead seal 46 of the second metal separator 16b which is the closest to the first insulating plate 64a securely and tightly contacts the first insulating plate 64a. Likewise, the seal member 52 provided on the bead seal 44 of the first metal separator 16a which is the closest to the second insulating plate 64b securely and tightly contacts the second insulating plate 64b. In the structure, the positions between the bead seals 44, 46 and the first insulating plate 64a and the second insulating plate 64b are sealed suitably.

That is, in the embodiment of the present invention, the positions between the first metal separator 16a, the second metal separator 16b, and the resin frame equipped MEA 14 as a type of the membrane electrode assembly can be sealed suitably. Likewise, the position between the first metal separator 16a and the second insulating plate 64b, and the position between the second metal separator 16b and the first insulating plate 64a can be sealed suitably as well.

Operation of the fuel cell stack 10 obtained as described above will be described below.

As shown in FIG. 2, an oxygen-containing gas, typically, a compressed air is supplied to the oxygen-containing gas supply passage 18a, and a fuel gas such as a hydrogen-containing gas, typically, a hydrogen gas is supplied to the fuel gas supply passage 22a. Further, a coolant such as water, ethylene glycol, oil is supplied to the coolant supply passage 20a.

The oxygen-containing gas is guided from the oxygen-containing gas supply passage 18a into the oxygen-containing gas flow field 40 of the second metal separator 16b and moves in the direction indicated by the arrow B, and then, the oxygen-containing gas is supplied to the cathode 36 of the power generation unit 28. In the meanwhile, the fuel gas is guided from the fuel gas supply passage 22a into the fuel gas flow field 38 of the first metal separator 16a. The fuel gas moves along the fuel gas flow field 38 in the direction indicated by the arrow B, and then, the fuel gas is supplied to the anode 34 of the power generation unit 28.

Thus, in the power generation unit 28, the oxygen-containing gas supplied to the cathode 36 and the fuel gas supplied to the anode 34 are consumed in the electrochemical reactions in the second electrode catalyst layer 36a and the first electrode catalyst layer 34a to perform power generation.

Then, in FIG. 2, the redundant oxygen-containing gas which passed the cathode 36 is discharged along the oxygen-containing gas discharge passage 18b in the direction indicated by the arrow A. Likewise, the redundant fuel gas which passed the anode 34 is discharged along the fuel gas discharge passage 22b in the direction indicated by the arrow A.

Further, the coolant supplied to the coolant supply passage 20a is guided into the coolant flow field 42 between the first metal separator 16a and the second metal separator 16b, and thereafter, the coolant flows in the direction indicated by the arrow B. After the coolant cools, especially, the power generation unit 28, the coolant is discharged from the coolant discharge passage 20b.

In the above process, the positions between the first metal separator 16a, the second metal separator 16b, and the resin frame member 30 can be sealed securely by the seal member 52. Therefore, it is possible to effectively prevent leakage of the fuel gas, the oxygen-containing gas (reactant gas), or the coolant through the positions between the first metal separator 16a, the second metal separator 16b, and the resin frame member 30.

The present invention is not limited to the above described embodiment. Various modifications can be made without departing from the gist of the present invention.

For example, instead of using the resin frame member 30, the electrolyte membrane 32 may be configured to protrude outward from the outer marginal portions of the anode 34 and the cathode 36. In this case, the membrane electrode assembly comprises the power generation unit 28 made up of the anode 34, the electrolyte membrane 32, and the cathode 36 without the resin frame member. The seal member 52 is joined to a portion of the electrolyte membrane 32 extending from the outer marginal portions of the anode 34 and the cathode 36.

In this case, frame shaped films may be provided on both sides of the electrolyte membrane 32 which protrudes outward beyond the anode 34 and the cathode 36, and the seal member 52 may be joined to the films.

Further, the pressure medium supplying step S2 may be performed at the same time as the aging operation of the fuel cell stack 10 after being newly assembled.

Further, instead of supplying the pressure medium in a circulating manner (by flow of the pressure medium at all times), the pressure medium may be supplied into the fuel cell stack 10 at the predetermined supply pressure, and thereafter, the pressure medium may fill the coolant flow field 42 in the fuel cell stack 10 and remain for a predetermined period of time. Further, the pressure medium is not limited to the liquid such as the hot water 74, and may be a gas such as the air and/or an inert gas.

Furthermore, in the embodiment of the present invention, although the fuel cell stack 10 is heated by allowing the hot water 74 to flow through the coolant flow field 42, a hot air may be brought into contact with the outer surfaces of the fuel cell stack 10. For this purpose, for example, a hot air furnace may be used.

What is claimed is:

1. A method of producing a fuel cell stack formed by stacking a plurality of power generation cells, the power generation cells each comprising:
- a first metal separator provided on one surface of a membrane electrode assembly, and a second metal separator provided on another surface of the membrane electrode assembly;
- a bead seal provided on a surface of each of the first metal separator and the second metal separator facing the membrane electrode assembly and protruding toward the membrane electrode assembly; and
- a seal member interposed between a top part of the bead seal and the membrane electrode assembly, the method comprising:
- a stacking step of stacking the plurality of power generation cells together to obtain the fuel cell stack; and
- a pressure medium supplying step of supplying pressure medium to a coolant flow field formed between the first metal separator and the second metal separator, wherein, in the pressure medium supplying step, the pressure medium is supplied at a supply pressure of not less than a supply pressure of a coolant supplied to the coolant flow field during normal operation of the fuel cell stack, in a state where the seal member is heated to a temperature at which the seal member is softened.

2. The method of producing the fuel cell stack according to claim 1, wherein the fuel cell stack comprises an insulating plate provided at an end of the plurality of power generation cells in the stacking direction; and
in the stacking step, the seal member provided on the top portion of the bead seal of the first metal separator or the second metal separator which is the closest to the insulating plate is in contact with the insulating plate.

3. The method of producing the fuel cell stack according to claim 1, wherein a pressure oriented in the stacking direction of the power generation cells is applied to the seal member by the pressure medium supplied to the coolant flow field.

4. The method of producing the fuel cell stack according to claim 1, wherein, in the pressure medium supplying step, at least the seal member is heated by supplying to the coolant flow field the pressure medium having been heated.

5. The method of producing the fuel cell stack according to claim 4, wherein the temperature of the pressure medium is measured by a temperature measurement instrument, and heating is controlled based on the measured temperature of the pressure medium.

6. The method of producing the fuel cell stack according to claim 4, wherein, in the pressure medium supplying step, hot water is supplied as the pressure medium.

7. The method of producing the fuel cell stack according to claim 6, wherein the temperature of the hot water is measured by the temperature measurement instrument, and heating of the hot water is controlled based on the measured temperature of the hot water.

8. The method of producing the fuel cell stack according to claim 4, wherein, in the pressure medium supplying step, a hot air is brought into contact with the fuel cell stack.

9. The method of producing the fuel cell stack according to claim 1, wherein the pressure medium is supplied at the supply pressure of 1.1 to 3 times larger than the supply pressure of the coolant during the normal operation of the fuel cell stack.

* * * * *